(12) United States Patent
Sawada et al.

(10) Patent No.: US 6,834,102 B2
(45) Date of Patent: Dec. 21, 2004

(54) SYSTEM AND METHOD FOR CONTROLLING TRANSFER

(75) Inventors: Masahiro Sawada, Yokohama (JP); Masami Yabusaki, Kashiwa (JP)

(73) Assignee: NTT DoCoMo, Inc., Tokyo (JP)

(*) Notice: Subject to any disclaimer, the term of this patent is extended or adjusted under 35 U.S.C. 154(b) by 14 days.

(21) Appl. No.: 10/014,850

(22) Filed: Dec. 14, 2001

(65) Prior Publication Data

US 2002/0076028 A1 Jun. 20, 2002

(30) Foreign Application Priority Data

Dec. 20, 2000 (JP) ........................................ 2000-386318

(51) Int. Cl.[7] .............................................. H04M 3/42
(52) U.S. Cl. .............................. 379/212.01; 379/210.01
(58) Field of Search ........................ 379/212.01, 210.01

(56) References Cited

U.S. PATENT DOCUMENTS 5,590,187 A * 12/1996 Greenspan ............. 379/212.01
6,035,190 A * 3/2000 Cox et al. .................... 455/417
6,064,874 A 5/2000 Cox et al. ................ 455/404.1

FOREIGN PATENT DOCUMENTS

| EP | 1026860 | 8/2000 |
| JP | 63187761 | 8/1988 |
| JP | 2000236394 | 8/2000 |

* cited by examiner

Primary Examiner—Ahmad F. Matar
Assistant Examiner—Quynh H. Nguyen
(74) Attorney, Agent, or Firm—Crowell & Moring LLP

(57) ABSTRACT

To provide a transfer control system that allows a call to be retransferred by a command from a source communication terminal and is capable of improving the convenience of a user issuing the command. In-communication information describing that a second terminal and a third terminal are now in communication with each other after a call is transferred in a state where a first terminal and the second terminal are in communication with each other is stored in a call state storage device. When a retransfer command is issued by the first terminal, the call is transferred to a fourth terminal by referring to the in-communication information stored in the call state storage device, thereby establishing communication between the second terminal and the fourth terminal.

5 Claims, 10 Drawing Sheets

SYSTEM AND METHOD FOR CONTROLLING TRANSFER

BACKGROUND OF THE INVENTION

1. Field of the Invention

The present invention relates to a transfer control system and transfer control method, and in particular, to a transfer control system and transfer control method for controlling transfer of a call in a communication system.

2. Description of the Prior Art

Generally, a call transmitted between two communication terminals can be transferred to a third party. That is, as shown in FIG. 11, in a state where communication terminals 1 and 2 communicate with each other via a communication control devices A, E, and B, a call can be transferred to a third party, specifically a communication terminal 3, thereby realizing a state change from the above state to another state where the communication terminals 3 and 2 communicate with each other via the communication control devices C, E, and B. In order to carry out such a transfer, first, the communication terminal 1 sends out a transfer command S101. Then, a transfer shown by an arrow S102 is carried out under the control of the communication control device A, and the state represented by broken lines in the drawing is changed into another state represented by thick solid lines in the same drawing. In this way, a call can be transferred.

In addition, from the destination third party (communication terminal 3 in FIG. 11), a call can be further transferred to another third party (for example, a communication terminal 4, not shown) in the same way. However, the source communication terminal (communication terminal 1 in FIG. 11) cannot issue a transfer command for the call.

Furthermore, a destination can be specified only by a user manually entering or selecting among from a destination list previously registered.

In the above-described system, once a communication terminal transfers a call involved in communication to a third party, the terminal cannot perform an action on the call such as command for transferring the call. Since the terminal cannot perform such an action, it cannot transfer again the call to another third party or itself.

Furthermore, in the above-described system, a destination can be specified only by entering the telephone number of the destination or selecting the telephone number stored in the communication terminal. Therefore, a user must push buttons over and over, resulting in the user convenience being degraded.

BRIEF SUMMARY OF THE INVENTION

The present invention is devised to solve the problems of the prior art described above, and an object of the present invention is to provide a transfer control system and transfer control method that allow a call to be retransferred by a command from the source communication terminal and are capable of improving the convenience of a user issuing the command.

A transfer control system according to the present invention includes storage means for storing in-communication information describing that a second terminal and a third terminal are now in communication with each other after a call is transferred in a state where a first terminal and the second terminal are in communication with each other; and call transfer means for transferring the call to a fourth terminal by referring to the in-communication information stored in the storage means when a transfer command is issued by the first terminal, thereby establishing communication between the second and fourth terminals.

Here, the first and fourth terminals may be different from each other, or may be identical with each other. In the former case, the transfer control system further includes means for making address inquiry via a rectilinear propagation channel, that is provided on the first terminal, and means, that is provided on another terminal, for sending back the address of the terminal itself to the first terminal in response to the address inquiry from the first terminal, in which the first terminal uses the received address to issue the transfer command.

A transfer control method according to the present invention includes a storing step of storing in-communication information describing that a second terminal and a third terminal are now in communication with each other after a call is transferred in a state where a first terminal and the second terminal are in communication with each other, and a call transfer step of transferring the call to a fourth terminal by referring to the in-communication information stored in the storing step when a transfer command is issued by the first terminal, thereby establishing communication between the second and fourth terminals.

Here, the first and fourth terminals may be different from each other, or may be identical with each other. In the former case, the transfer control method further includes an inquiry step of making address inquiry from the first terminal to another terminal via a rectilinear propagation channel, and a send-back step of sending back, in another terminal, the address of the terminal itself to the first terminal in response to the address inquiry from the first terminal, in which, in the call transfer step, the first terminal uses the address received in the send-back step to issue the transfer command.

A transfer control terminal according to the present invention using storage device for storing in-communication information describing terminals that are now in communication after a call is transferred includes means for making address inquiry to another terminal; and means for issuing command for re-transferring the cal to the storage device using received addressed from the another terminal.

Here, the address inquiry is carried out via rectilinear propagation channel. In one embodiment he command for re-transferring the call, a terminal that now in communication before transfer the call and said another terminal are different from each other. In another embodiment the command for re-transferring the call, a terminal that now in communication before transfer the call and said another terminal are identical with each other.

In short, according to the present invention, after a call being transmitted is transferred to a third party, the call can be further transferred to another third party by a command from the source communication terminal.

Alternatively, after a call being transmitted is transferred to a third party, the call can be further transferred to the source communication terminal by a command from the source communication terminal.

The destination address maybe automatically set through communication between the terminals or may be manually set without such a communication. The destination address may be the address of the source terminal itself.

BRIEF DESCRIPTION OF THE DRAWINGS

FIG. 3 is a signal sequence diagram illustrating the operation of the transfer control system, in which FIG. 3(A) represents the state of FIG. 2, and FIG. 3(B) represents a state of FIG. 4;

FIG. 6 is a signal sequence diagram illustrating the operation of the transfer control system, in which FIG. 6(A) represents the state of FIG. 5, FIG. 6(B) represents a state of FIG. 7, and FIG. 6(C) represents a state of FIG. 8;

DETAILED DESCRIPTION OF THE PREFERRED EMBODIMENTS

Figure 1:
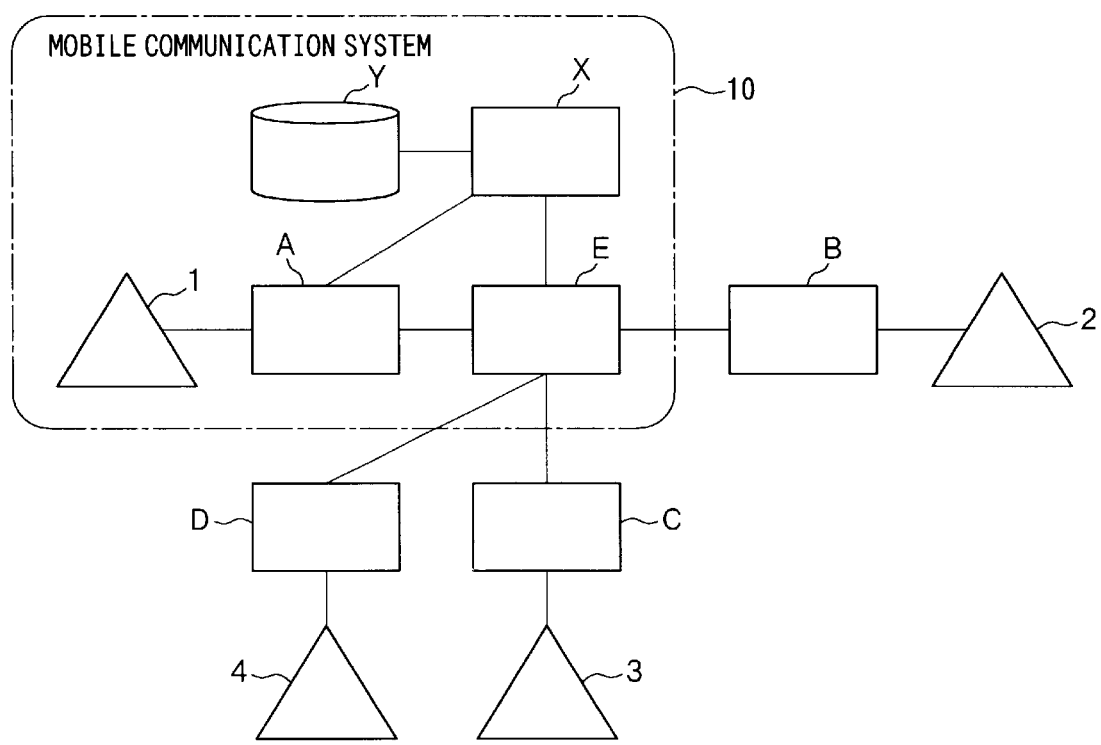
FIG. 1 is a block diagram showing a configuration of a communication system for implementing a transfer control system according to the present invention.

Now, embodiments of the present invention will be described with reference to the drawings. In the drawings referred to in the following description, similar elements are given the same reference numeral.

FIG. 1 is a block diagram showing a configuration of a communication system for implementing a transfer control system according to the present invention. A mobile communication system 10 shown in FIG. 1 includes a communication terminal 1, a communication control device A, a communication control device E, a service control device X, and a call state storage device Y. The communication terminal 1 may be a mobile communication terminal, which can communicate with another communication terminal via the communication control device A. While it is assumed in this embodiment that a mobile communication terminal enabled to carry out communication by the mobile communication system 10 is included, the transfer control system of the present invention is applicable to a communication terminal other than the mobile terminal, such as a fixed communication terminal.

The service control device X controls the whole of the communication system. In addition, under the control of the service control device X, communication information describing the state of a communication between the communication terminals is stored in the call state storage device Y, and in-communication information stored therein is read out.

The communication system shown in FIG. 1 further includes communication terminals 2, 3 and 4, and communication control devices B, C and corresponded to the respective communication terminals. The communication control devices B, C and D are connected to the communication control device E.

Figure 2:
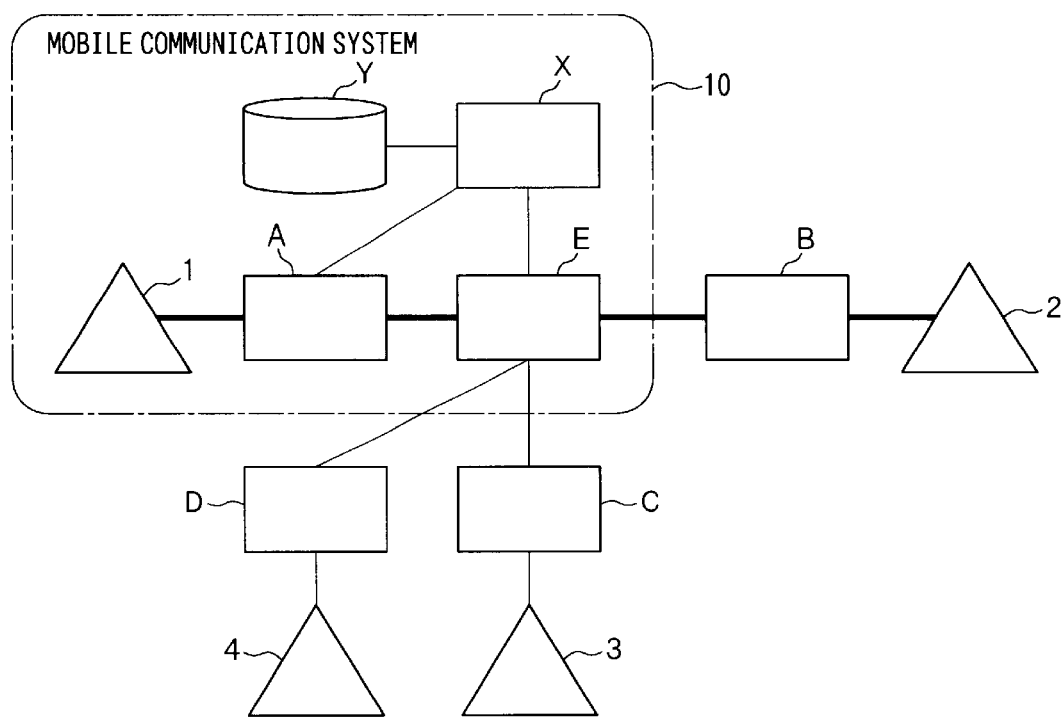
FIG. 2 illustrates the transfer control system in FIG. 1 in a state of being in communication.
Figure 3:
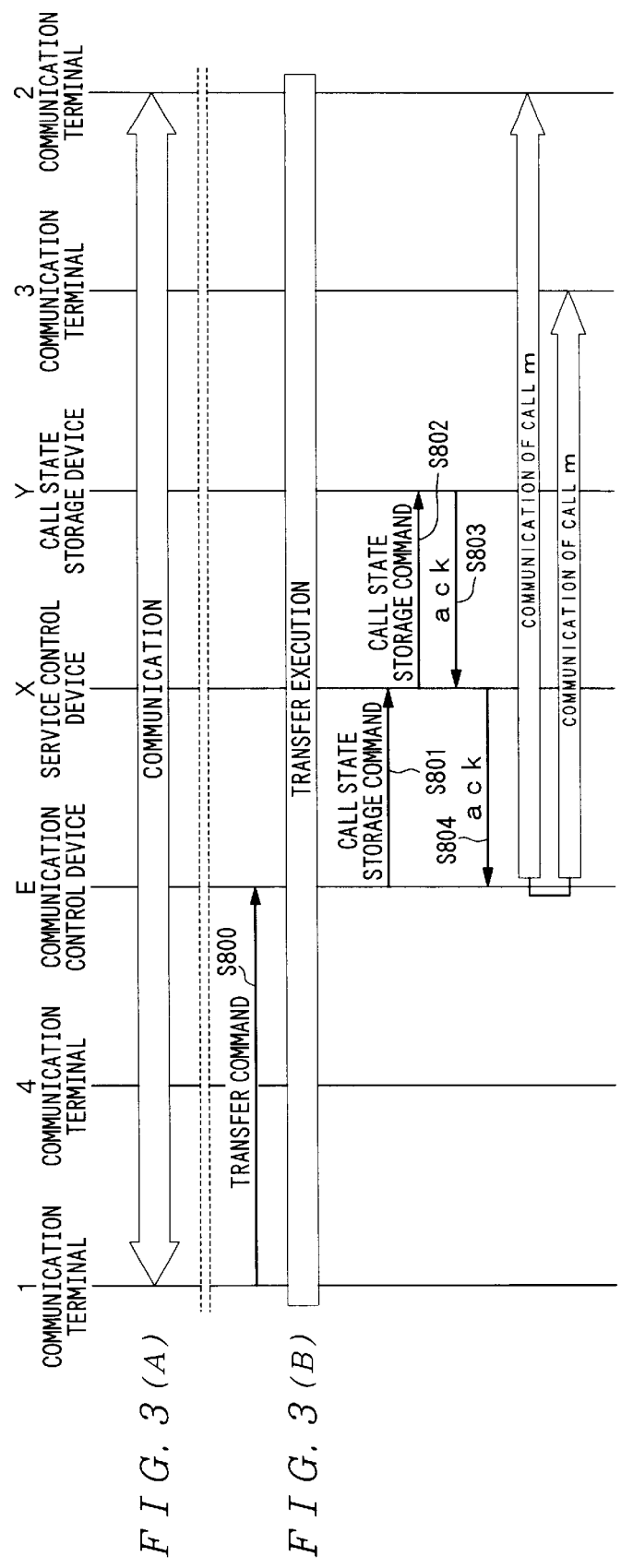

In the communication system thus configured, a state shown in FIG. 2 where a call is originated and the communication terminals 1 and 2 are communicating with each other is to be considered. In this state, the communication control device E holds an identifier of the communication terminal 1. The state shown in FIG. 2 is a state where the communication terminals 1 and 2 are in communication with each other as shown in FIG. 3(A).

Figure 4:
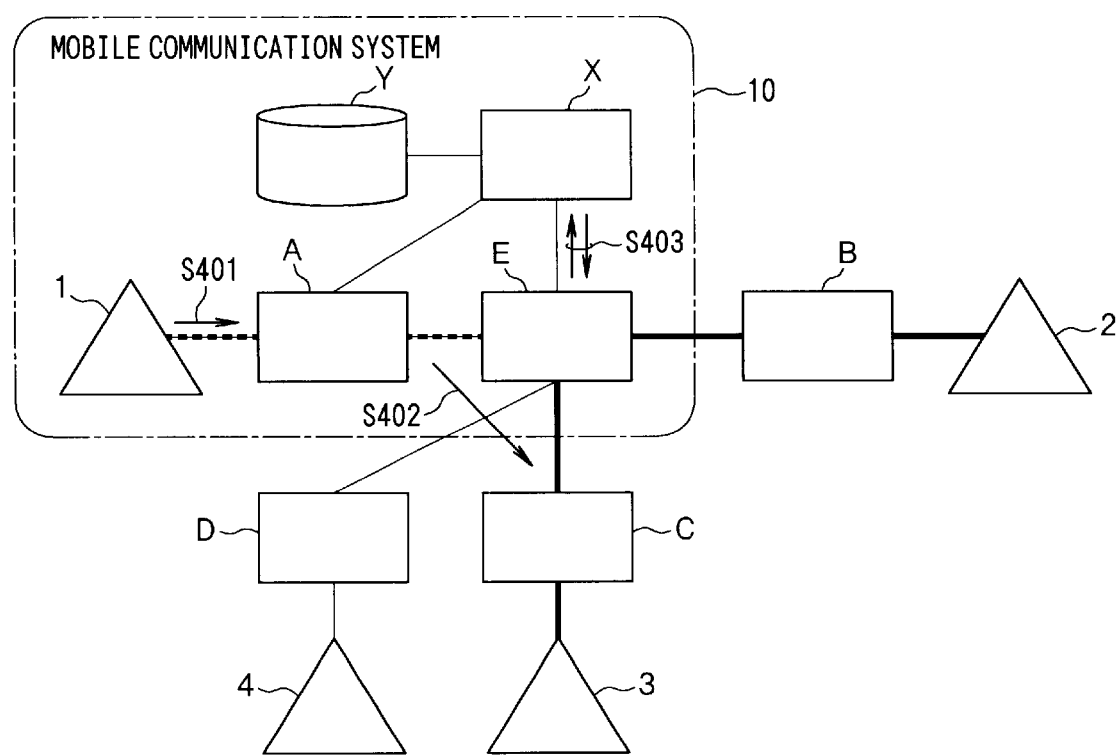
FIG. 4 illustrates the transfer control system in FIG. 1 in a state where a first transfer has been carried out.

When, starting from the state shown in FIG. 2, a call is to be transferred to the communication terminal 3 as shown in FIG. 4, the transfer is carried out in the following procedure. Specifically, when the communication terminal 1 sends out a transfer command (step S401), a call is transferred as indicated by an arrow S402. The communication control device E records its address and a transfer call state consisting of a transfer call identifier in the call state storage device Y that can be specified by the identifier of the communication terminal 1 via the service control device X that can be specified by the identifier of the communication terminal 1 (step S403).

In this transfer instruction, the following transmission is carried out between the communication terminals 1 and 3. That is, the source communication terminal 1 is directed toward the communication terminal 3, which is a desired destination, to transmit a number read from the source communication terminal to the desired destination communication terminal via a rectilinear propagation channel such as infrared ray, the address of the destination is sent back in the reverse direction and set in the source communication terminal, and the transfer command is transmitted to a network. In this regard, the communication terminal may be configured so that the communication between the terminals, setting in the source terminal, and transmission of the transfer command to the network are accomplished through a few manipulations, for example, by simply pushing once a button. Such a configuration will be described later.

Depending on the internal configuration of the communication terminal, even if the above-described operations are carried out, the mobile terminal may not establish the above-described communication with another communication terminal. In such a case, the address may be manually set via manipulation of key buttons or the like, and the transfer command may be transmitted to the network.

The state of FIG. 4 described above is shown in FIG. 3(B) As shown in the drawing, the communication terminal 1 transmits a transfer command S800 to the communication control device E. Here, the destination address is "3". Then, transfer of a call is carried out. In order to store the transfer state of the call, the communication control device E transmits a call state storage command S801 to the service control device X. Here, the source address is "1", the communication control device address is "E", and a call identifier for identifying the call is "m".

When the service control device X receives the call state storage command from the communication control device E, the service control device X transmits a call state storage command S802 to the call state storage device Y. Here, the source address is "1", the communication control device address is "E", and a call identifier for identifying the call is "m". Thus, the call state storage device Y stores certain information. More particularly, it stores the communication control device address "E" and call identifier "m" by using the identifier "1" of the source communication terminal 1 as an index.

When the storage of the call state is completed, the call state storage device Y send back an acknowledgement (ack) S803 to the service control device X, and an acknowledgement (ack) S804 is transmitted to the communication control device E. By the procedure described above, the communication terminals 2 and 3 enter a state of being in communication with each other via the call m.

Figure 5:
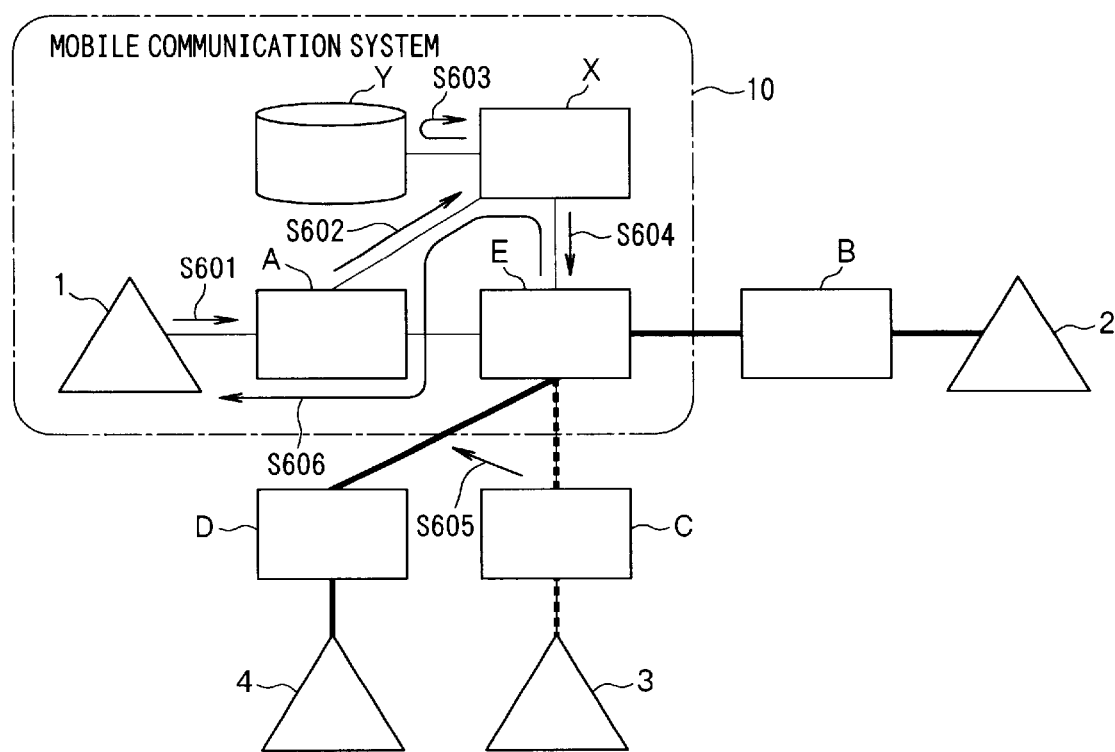
FIG. 5 illustrates the transfer control system in FIG. 1 in a state where a retransfer to another third party has been carried out.

FIG. 5 shows an operation in the case where the address of the retransfer destination is the communication terminal 4. In the drawing, when the communication terminals 2 and 3 are in communication with each other as represented by broken lines, the call is transferred to the communication terminal 4 by the command from the communication terminal 1 as represented by thick solid lines so that the communication terminals 2 and 4 enter a state of being in communication with each other.

First, the communication terminal 1 sends out a retransfer command including the identifier of the communication terminal 1 and the address of the retransfer destination (step S601). When the communication control device A receives the command, it transfers the command to the service control device X that can be specified by the identifier of the communication terminal 1 (step S602).

Also in this transfer instruction, the following transmission is carried out between the communication terminals 1 and 4. That is, the source communication terminal 1 is directed toward the communication terminal 4, which is a desired destination, a number read command is sent from the source communication terminal to the desired destination communication terminal via a rectilinear propagation channel such as infrared ray, the destination address is sent back in the reverse direction, the address is set in the source communication terminal, and the transfer command is transmitted to a network. In this regard, the communication terminal may be configured so that the communication between the terminals, setting in the source communication terminal, and transmission of the transfer command to the network are completed through a few manipulations, for example, by simply pushing once a button.

Depending on the internal configuration of the communication terminal, even if the above-described operations are carried out, the mobile terminal may not establish the above-described communication with another communication terminal. In such a case, the address of the communication terminal 4 may be manually set via manipulation of key buttons or the like, and the transfer command may be transmitted to the network.

The service control device X uses the identifier of the communication terminal 1 to read out the transfer call state of the communication terminal 1 from the call state storage device Y (step S603). The service control device X uses the identifier E included in the transfer call state to specify the communication control device E, and then transmits to the communication control device E the retransfer command including the transfer call identifier "m" and the address of the retransfer destination (step S604). When the communication control device E receives the command, it retransfers the call specified by the transfer call identifier "m" to the address of the retransfer destination. Thus, the transfer indicated by an arrow S605 is carried out, and the state represented by the broken lines changes into the state represented by the thick solid lines.

Finally, the communication control device E transmits an acknowledgement signal indicating that the retransfer is carried out to the communication terminal 1 (step S606). In this way, the retransfer of a call can be carried out.

Figure 6:
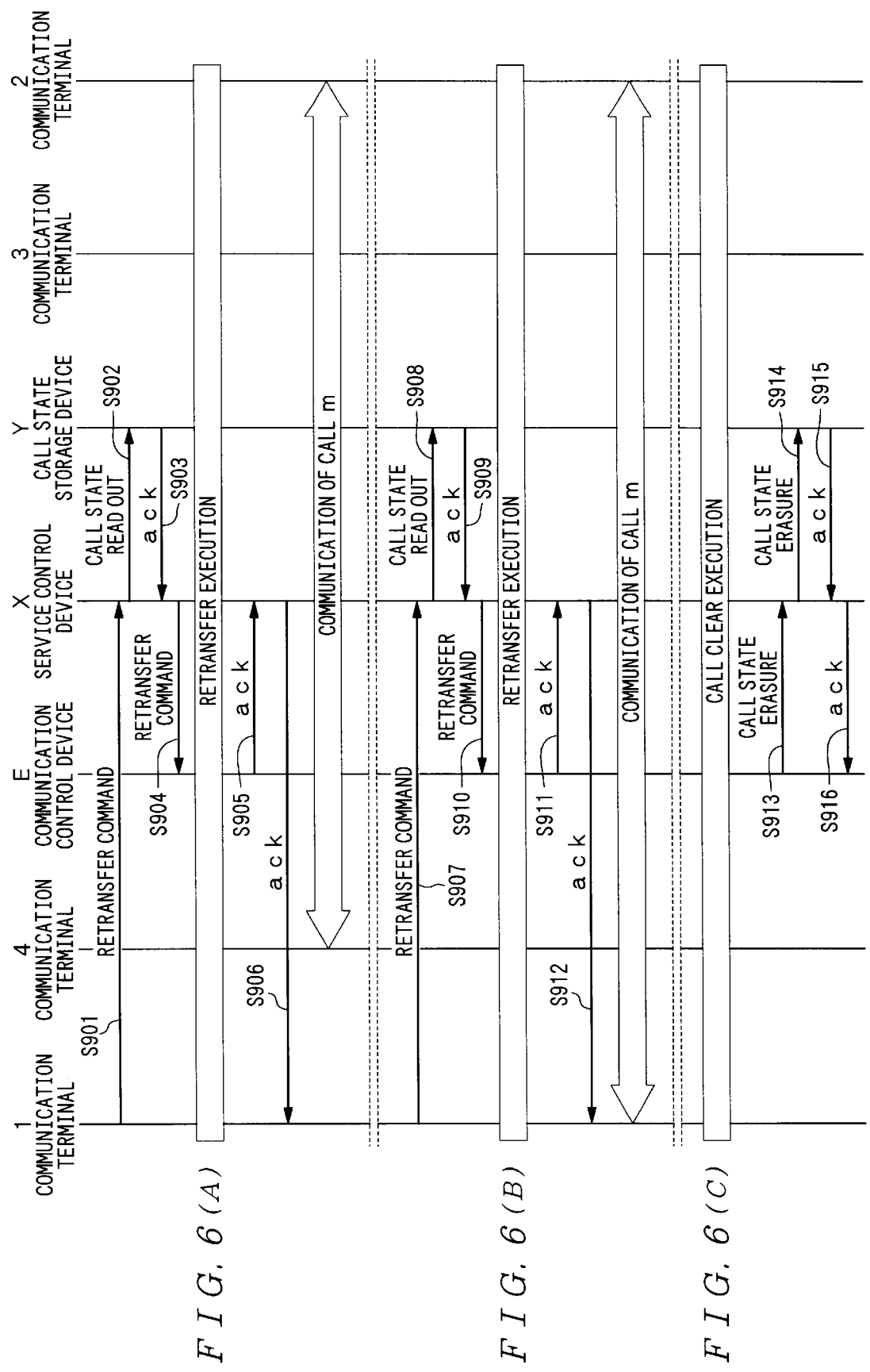

The state of FIG. 5 described above is shown in FIG. 6(A). As shown in the drawing, the communication terminal 1 transmits a retransfer command S901 to the service control device X. Here, the address of the retransfer destination is "4", and the source address is "1". When the service control device X receives the retransfer command S901, it transmits a call state read command S902 to the call state storage device Y. Here, the source address is "1".

Then, in response to the call state read command S902, the call state storage device Y send back an acknowledgement (ack) S903 to the service control device X. This acknowledgement indicates the communication control device address "E" and the call identifier "m".

When the service control device X receives the acknowledgement S903, it transmits a retransfer command S904 to the communication control device E. Here, the address of the retransfer destination is "4", and the call identifier is "m". In this way, the retransfer is carried out.

When the retransfer is completed, the communication control device E sends back an acknowledgement (ack) S905 to the service control device X, and when the service control device X receives the acknowledgement, it transmits an acknowledgement (ack) S906 to the communication terminal 1. By the procedure described above, the communication terminals 2 and 4 enter a state of being in communication with each other via the call m.

Figure 7:
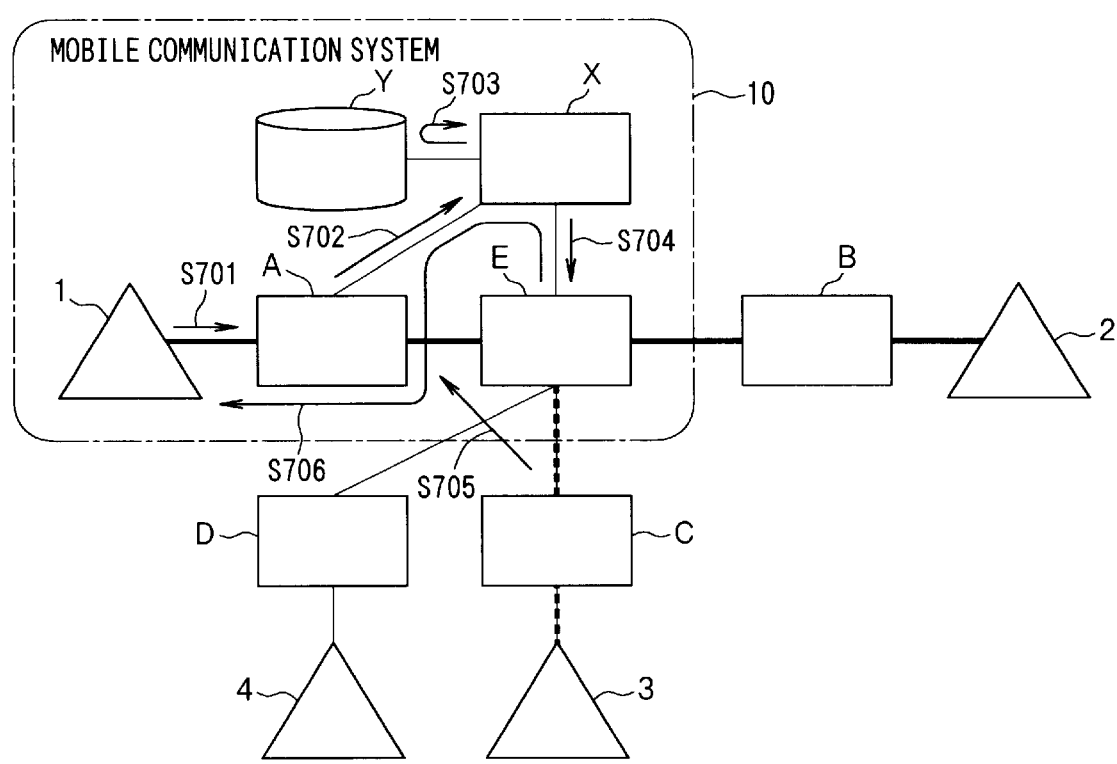
FIG. 7 illustrates the transfer control system in FIG. 1 in a state where a retransfer to the source communication terminal has been carried out.

FIG. 7 shows an operation in the case where the address of the retransfer destination is the communication terminal 1, in other words, in the case where the call returns to the source communication terminal 1. Specifically, when the communication terminals 2 and 3 are in communication with each other as represented by broken lines in this drawing, the call is transferred to the communication terminal 1 by the command from the communication terminal as represented by thick solid lines.

As shown in FIG. 7, first, the communication terminal 1 sends out a retransfer command including the identifier of the communication terminal 1 and the address of the retransfer destination (step S701). When the communication control device A receives the command, it transfers the command to the service control device X that can be specified by the identifier of the communication terminal 1 (step S702). In this transfer instruction, the address of the communication terminal 1 itself may be manually set via manipulation of key buttons or the like, and the transfer command may be transmitted to the network.

The service control device X uses the identifier of the communication terminal 1 to read out the transfer call state of the communication terminal 1 from the call state storage device Y (step S703). The service control device X uses the identifier E included in the transfer call state to specify the communication control device E, and then transmits to the communication control device E the retransfer command including a transfer call identifier and the address of the retransfer destination (step S704). When the communication control device E receives the command, it retransfers the call specified by the transfer call identifier to the address of the retransfer destination. Thus, the transfer indicated by an arrow S705 is carried out, and the state represented by the broken lines changes into the state represented by the thick solid lines.

Finally, the communication control device E transmits an acknowledgement signal indicating that the retransfer is carried out to the communication terminal 1 (step S706). In this way, the retransfer of a call can be carried out.

The state of FIG. 7 described above is shown in FIG. 6(B). As shown in the drawing, the communication terminal 1 transmits a retransfer command S907 to the service control device X. Here, the address of the retransfer destination is "1", and the source address is also "1". When the service control device X receives the retransfer command S907, it transmits a call state read command S908 to the call state storage device Y. Here, the source address is "1".

Then, in response to the call state read command S908, the call state storage device Y send back an acknowledgement (ack) S909 to the service control device X. This acknowledgement indicates the communication control device address "E" and the call identifier "m".

When the service control device X receives the acknowledgement S909, it transmits a retransfer command S910 to the communication control device E. Here, the address of the retransfer destination is "1", and the call identifier is "m". In this way, the retransfer is carried out.

When the retransfer is completed, the communication control device E sends back an acknowledgement (ack) S911 to the service control device X, and when the service control device X receives the acknowledgement, it transmits an acknowledgement (ack) S912 to the communication terminal 1. By the procedure described above, the communication terminals 1 and 2 enter a state of being in communication with each other via the call m.

By this procedure, the call state storage device Y stores certain information. More particularly, it stores the address of the communication control device and transfer call number by using the identifier of the source communication terminal 1 as an index.

Figure 8:
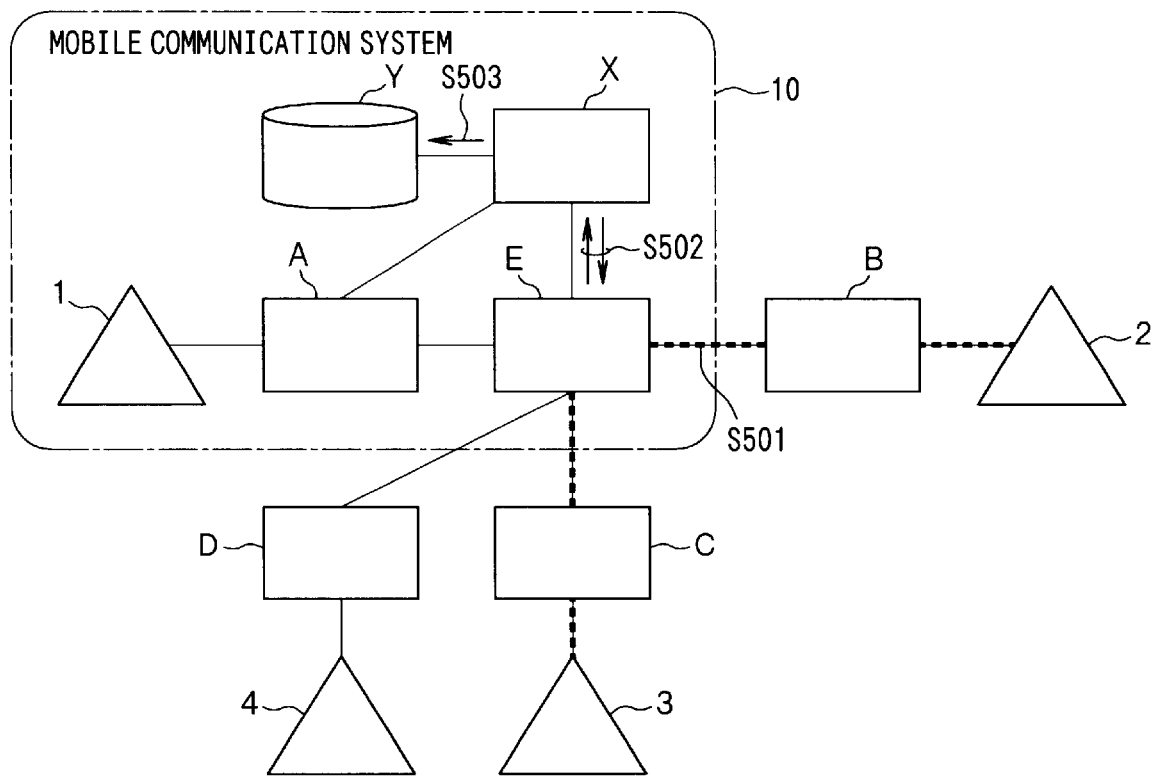
FIG. 8 illustrates the transfer control system in FIG. 1 in a state where a transfer call has been cleared.

FIG. 8 illustrates the operation in the case where a call is cleared. In this example, a case will be described where the call represented by broken lines in the drawing, that is, the call transmitted between the communication terminals 2 and 3 is cleared, and thus the communication between the two terminals is disconnected.

In the drawing, even when the call S501 is cleared, the call state storage device Y still holds the information describing the transfer call state. If a state erasure command is issued by the communication control device E (step S502), the information stored in the call state storage device Y is erased by the service control device X (step S503).

The state of FIG. 8 described above is shown in FIG. 6(C). As shown in the drawing, when the call clear is carried out, the communication control device E transmits a call state erasure command S913 to the service control device X. Here, the source address is "1".

When the service control device X receives the call state erasure command S913 from the communication control device E, it transmits a call state erasure command S914 to the call state storage device Y. Here, the source address is "1". In response to the command, the erasure of the stored call state is carried out in the call state storage device Y.

When the erasure of the stored call state is completed, the call state storage device Y sends back an acknowledgement (ack) S915 to the service control device X, and then an acknowledgement (ack) S916 is transmitted to the communication control device E. By the procedure described above, the call clear is completed.

As described above, in order to specify the address of a destination, the address of the destination may be directly entered on the source communication terminal, or may be acquired from the destination communication terminal rather than directly entered on the source communication terminal. In the case where the address of the destination communication terminal is acquired from the same terminal, the retransfer command is to be transmitted by using the address.

In order to acquire the address of the destination communication terminal from the same terminal, the following procedure is to be carried out. That is, a well-known infrared transmission feature is provided on each of the communication terminals, and a specific button (switch) is pushed in a manner similar to the manipulation of a remote controller. By this manipulation, a command for sending back the address is transmitted to the destination terminal.

In response to the command, the destination terminal transmits the address (telephone number) of its own, and the source terminal receives the address. Then, the source terminal uses the received address to transmit the retransfer command. In other words, the address is transmitted directly between the two terminals, and the received address is used to transfer a call.

Figure 9:
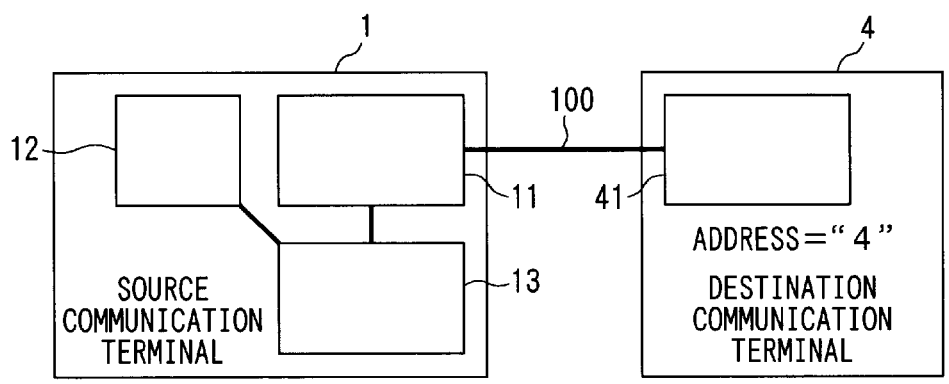
FIG. 9 is a block diagram showing an internal configuration of a communication terminal.

FIG. 9 shows a structure additionally provided in a communication terminal in order to realize the above-described feature. FIG. 9 shows respective internal configurations of the source communication terminal 1 and the destination communication terminal 4. In this drawing, the communication terminal 1 includes a manward interface 13 including a push button and display unit such as a LCD, a destination address inquiry feature 11 for inquiring about the address of the destination communication terminal 4 by transmitting infrared signals, and a call control feature 12 for originating and transferring a call for the address entered via the manward interface 13.

On the other hand, the communication terminal 4 includes a destination address response feature 41 that responds to the address inquiry from the source communication terminal 1 to send back its address. In this example, the address (telephone number) of the communication terminal is "4".

In addition, communication between the communication terminals 1 and 4 shown in the drawing is established by transmitting the infrared signals in this example. Not being limited to the transmission of the infrared signals, this communication may be established by utilizing a feature enabling direct communication.

Figure 10:
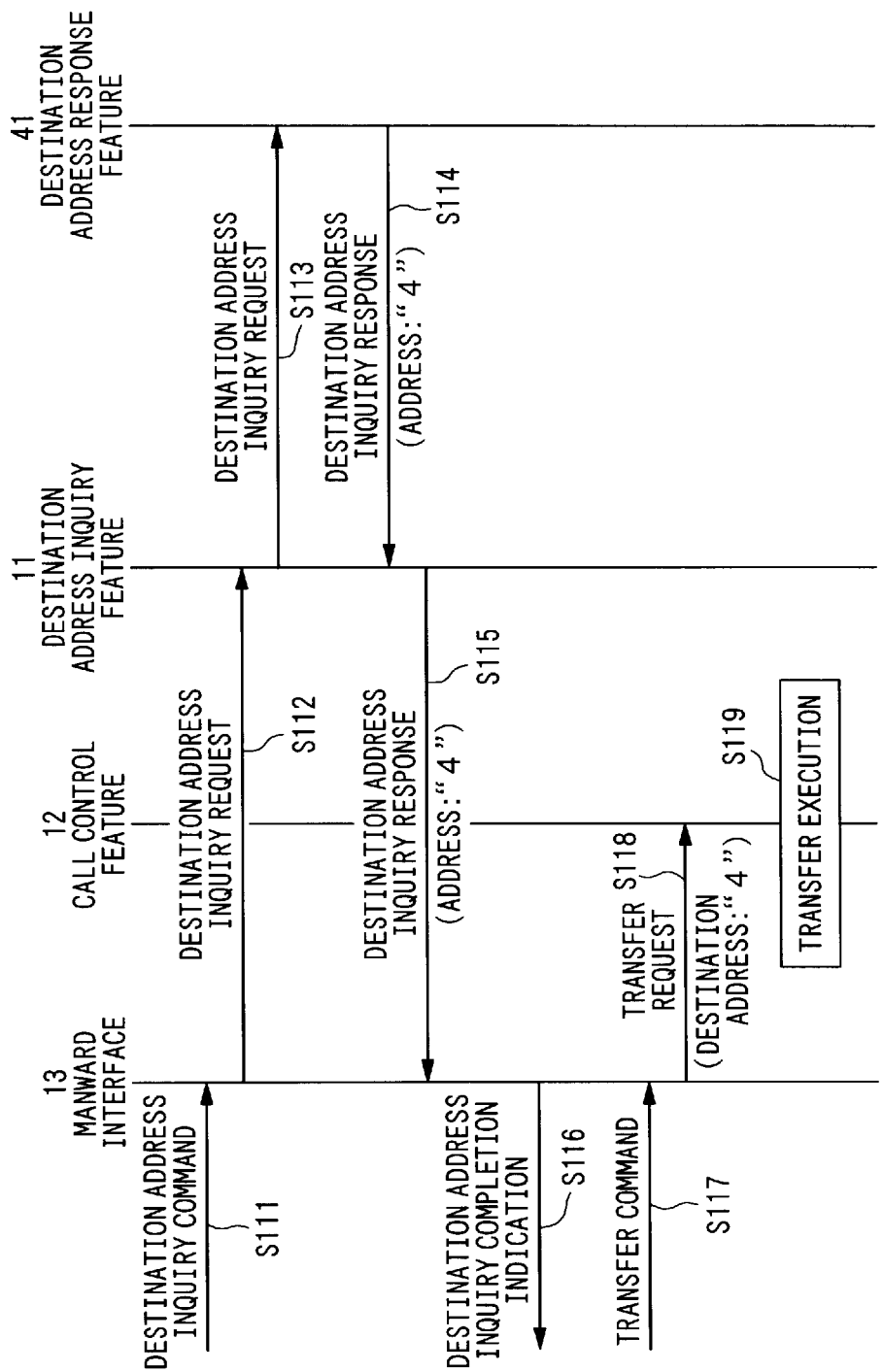
FIG. 10 is a signal sequence diagram illustrating operations of the respective parts of the communication terminals shown in FIG. 9.
Figure 11:
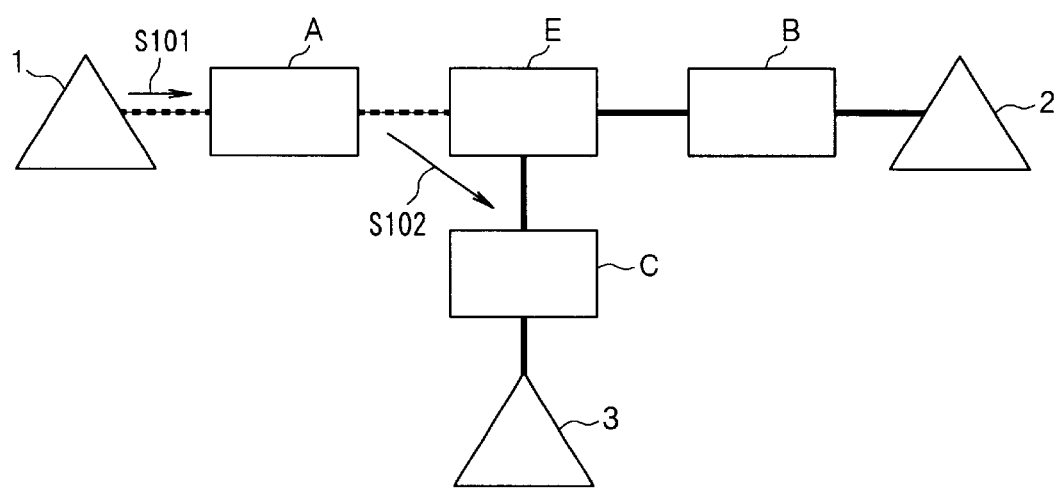
FIG. 11 a block diagram showing a configuration of a communication system for implementing a conventional transfer control system.

FIG. 10 illustrates a sequence of operations of respective parts of the communication terminals 1 and 4 shown in FIG. 9. As shown in this drawing, when a destination address inquiry command S111 is entered on the manward interface 13 by a user pushing a button, for example, a destination address inquiry request S112 is transmitted from the manward interface 13 to the destination address inquiry feature 11. Then, the destination address inquiry feature 11 transmits a destination address inquiry request S113 to the destination address response feature 41.

When the destination address response feature 41 receives the destination address inquiry request S113, it sends out a destination address inquiry response S114. The destination address inquiry response S114 represents the address "4". When the destination address inquiry feature 11 receives the destination address inquiry response S114, it transmits a destination address inquiry response S115 to the manward interface 13. The destination address inquiry response S115 also represents the address "4".

When the manward interface 13 receives the destination address inquiry response S115, it sends out a destination address inquiry completion indication S116, and then the address is displayed on a display (not shown), for example. In this example, the address "4" is displayed.

In response to a transfer command S117 entered by a user having confirmed the displayed information by pushing of a button, for example, the manward interface 13 transmits a transfer request S118 to the call control feature 12. The transfer request is accompanied with the address "4". Upon receiving the transfer request S118, the call control feature 12 carries out a transfer execution process S119. Here, the transfer execution process S119 is equivalent to the step S401 in FIG. 4, step S601 in FIG. 5, and step S701 in FIG. 7.

In the above-described operation, after the user confirms the destination address on the display or the like, the user enters the transfer command. In such a situation, the user is required to enter the two commands separately. Thus, immediately after the address is acquired via the destination address inquiry response, the transfer execution process may be carried out by using the address without confirmation of the displayed information. In this way, the transfer instruction can be carried out through a few manipulations, for example, by simply pushing once a button as described above.

In this system, as described above, the state of the transfer is stored in a storage device in the network that is accessible to a communication terminal. The retransfer is carried out in such a manner that the communication terminal transmits the retransfer command to the transferred call control device via the storage device to make the transferred call control device transfer the call to another third party or the communication terminal itself.

Furthermore, the source communication terminal is directed toward the communication terminal, which is a desired destination, to transmit a number read command from the source communication terminal to the desired destination communication terminal via a rectilinear propagation channel such as infrared ray, the address of the destination is sent back in the reverse direction and set in the source communication terminal, and then the transfer command is transmitted to the network.

The communication between the terminals, setting in the source communication terminal, and transmission of the transfer command to the network are accomplished through a few manipulations, for example, by simply pushing once a button. If the source communication terminal cannot establish the above-described communication with another communication terminal by the above-described operations, it sets the address of its own as the destination address and transmits the transfer command to the network.

Since retransfer can be carried out as described above, the present system can be used in the following manner. For example, with a conventional system, when communication via a videophone is carried out on a mobile station (source terminal), the call can be transferred to another videophone with a larger screen by the mobile station moving to the large-screen videophone.

With the present system, the transferred call can be further transferred to another videophone from the mobile station. For example, if a user want to see data displayed on a display of a personal computer (hereinafter referred to as PC) when he or she uses a videophone, the call can be further transferred to the PC. In addition, if the user is then required to move, he or she can move by transferring the call to the mobile station, and further move into another room.

On the other hand, in the communication system described above, the following transfer control method is implemented. That is, the transfer control method for establishing communication between a second and fourth terminals includes a storing step of storing in-communication information describing that the second terminal and a third terminals are now in communication with each other after a call is transferred in a state where a first terminal and the second terminal are in communication with each other, and a call transfer step of transferring the call to the fourth terminal by referring to the in-communication information stored in the storing step when a transfer command is issued by the first terminal.

As described above, the present invention has an advantage that the communication terminal can be used in a manner similar to a remote controller for controlling the transfer call to retransfer a call, thereby improving the user convenience.

What is claimed is:

1. A transfer control system comprising;
   storage means for storing in-communication information describing that a second terminal and a third terminal are now in communication with each other after a call is transferred in a state where a first terminal and said second terminal are in communication with each other;
   call transfer means for transferring the call to said fourth terminal, which is a different terminal from said first terminal, by referring to the in-communication information stored in said storage means when a transfer command is issued by said first terminal, means for making address inquiry via a rectilinear propagation channel, that is provided on the first terminal; and
   means, that is provided on another terminal, for sending back the address of the terminal itself to said first terminal in response to the address inquiry from said first terminal,
   wherein said first terminal uses the received address to issue said transfer command for establishing communication between said second and fourth terminals.

2. A transfer control method comprising;
   a storing step of storing in-communication information describing that a second terminal and a third terminal are now in communication with each other after a call is transferred in a state where a first terminal and said second terminal are in communication with each other; and
   a call transfer step of transferring the call to said fourth terminal, which is a different terminal from said first terminal, by referring to the in-communication information stored in said storing step when a transfer command is issued by said first terminal an inquiry step of making address inquiry from said first terminal to another terminal via a rectilinear propagation channel; and
   a send-back step of sending back, in said another terminal, the address of the terminal itself to said first terminal in response to the address inquiry from said first terminal,
   wherein, in said call transfer step, said first terminal uses the address received in said send-back step to issue said transfer command for establishing communication between said second and fourth terminals.

3. A transfer control terminal using storage device for storing in-communication information describing that now in communication after a call is transferred comprising;
   means for making address inquiry to another terminal; and
   means for issuing command for re-transferring the call to the storage device using received address from the another terminal wherein said address inquiry is carried out via rectilinear propagation channel.

4. A transfer control terminal as set forth in claim 3, wherein the command for re-transferring the call,
   a terminal that now in communication before transferring the call and said another terminal are different from each other.

5. A transfer control terminal as set forth in claim 3, wherein the command for re-transferring the call,
   a terminal that is in communication before transferring the call and said another terminal are identical with each other.

* * * * *